(12) United States Patent
Kobayashi et al.

(10) Patent No.: US 10,000,206 B2
(45) Date of Patent: Jun. 19, 2018

(54) CONTROL APPARATUS FOR POWER TRANSMISSION SYSTEM

(71) Applicant: TOYOTA JIDOSHA KABUSHIKI KAISHA, Toyota-shi, Aichi-ken (JP)

(72) Inventors: Nobufusa Kobayashi, Anjo (JP); Masato Yoshikawa, Toyota (JP); Takaaki Tanaka, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days. days.

(21) Appl. No.: 15/361,208

(22) Filed: Nov. 25, 2016

(65) Prior Publication Data

US 2017/0166202 A1    Jun. 15, 2017

(30) Foreign Application Priority Data

Dec. 9, 2015  (JP) .................. 2015-240644

(51) Int. Cl.

| B60W 20/50 | (2016.01) |
|---|---|
| F16H 61/02 | (2006.01) |
| F16H 61/12 | (2010.01) |
| F16H 3/72 | (2006.01) |
| F16H 3/66 | (2006.01) |
| B60K 6/445 | (2007.10) |

(Continued)

(52) U.S. Cl.
CPC .............. *B60W 20/50* (2013.01); *B60K 6/445* (2013.01); *F16H 3/727* (2013.01); *F16H 61/0204* (2013.01); *F16H 61/12* (2013.01); *F16H 3/66* (2013.01); *F16H 2003/445* (2013.01); *F16H 2061/1296* (2013.01); *F16H 2200/2007* (2013.01); *F16H 2200/2041* (2013.01); *F16H 2200/2066* (2013.01); *F16H 2200/2082* (2013.01)

(58) Field of Classification Search
CPC ........ B60W 20/50; B60K 6/445; F16H 3/727; F16H 61/0204; F16H 61/12; F16H 3/66; F16H 2003/445; F16H 2200/2007; F16H 2200/2041; F16H 2200/2066
USPC ..................................................... 701/22
See application file for complete search history.

(56) References Cited

U.S. PATENT DOCUMENTS

| 7,534,191 B2 * | 5/2009 | Endo ................. B60K 6/365 477/115 |
|---|---|---|
| 9,254,739 B2 * | 2/2016 | Uchida ................. B60K 6/42 |
| 9,404,569 B2 * | 8/2016 | Arnold ............ F16H 61/0213 |

(Continued)

FOREIGN PATENT DOCUMENTS

| JP | 2005-291435 A | 10/2005 |
|---|---|---|
| JP | 2006-327583 A | 12/2006 |

(Continued)

*Primary Examiner* — Krishnan Ramesh
(74) *Attorney, Agent, or Firm* — Oliff PLC

(57) ABSTRACT

When an electrical continuously variable transmission malfunctions and the operation of an engine is stopped, an automatic transmission is caused to upshift. Therefore, when the rotation of the engine is stopped as a result of a stop of the operation, an AT input rotation speed is decreased as compared to that before it is determined that there is a malfunction in the electrical continuously variable transmission. Thus, an MG1 rotation speed is decreased in absolute value as compared to when the automatic transmission is not caused to upshift, so an overspeed of a first electric motor is prevented.

5 Claims, 4 Drawing Sheets

(51) Int. Cl.
 *F16H 3/00* (2006.01)
 *F16H 3/44* (2006.01)

(56) References Cited

U.S. PATENT DOCUMENTS

| | | | | |
|---|---|---|---|---|
| 2007/0179014 A1* | 8/2007 | Endo | .................. | B60K 6/365 |
| | | | | 477/3 |
| 2007/0179015 A1* | 8/2007 | Johnson | ................ | B60K 6/485 |
| | | | | 477/8 |
| 2007/0219045 A1 | 9/2007 | Ogata et al. | | |
| 2014/0236438 A1* | 8/2014 | Arnold | ............... | F16H 61/0213 |
| | | | | 701/60 |
| 2015/0148186 A1* | 5/2015 | Uchida | ................... | B60K 6/42 |
| | | | | 477/3 |

FOREIGN PATENT DOCUMENTS

| | | |
|---|---|---|
| JP | 2007-246011 A | 9/2007 |
| JP | 2009-143417 A | 7/2009 |
| JP | 2009-280176 A | 12/2009 |
| JP | 2010-012827 A | 1/2010 |
| JP | 2014-065365 A | 4/2014 |

* cited by examiner

|  | C1 | C2 | B1 | B2 | F1 |
|---|---|---|---|---|---|
| 1st | ○ |  |  | △ | ○ |
| 2nd | ○ |  | ○ |  |  |
| 3rd | ○ | ○ |  |  |  |
| 4th |  | ○ | ○ |  |  |

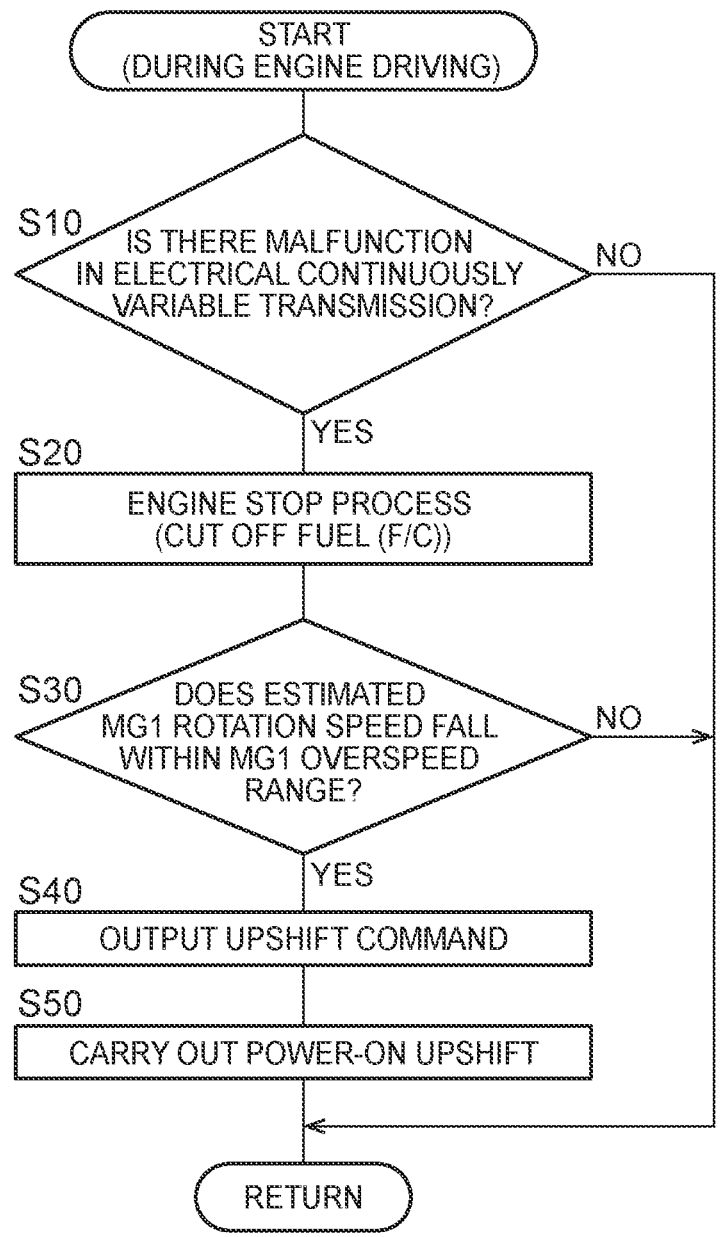

CONTROL APPARATUS FOR POWER TRANSMISSION SYSTEM

INCORPORATION BY REFERENCE

The disclosure of Japanese Patent Application No. 2015-240644 filed on Dec. 9, 2015 including the specification, drawings and abstract is incorporated herein by reference in its entirety.

BACKGROUND

1. Technical Field

The disclosure relates to a control apparatus for a power transmission system including an electrical transmission mechanism and a mechanical transmission mechanism in series with each other.

2. Description of Related Art

There is well known a control apparatus for a power transmission system including an electrical transmission mechanism, a second electric motor and a mechanical transmission mechanism. The electrical transmission mechanism includes a differential mechanism and a first electric motor. An engine is coupled to the differential mechanism such that power is transmitted. The first electric motor is coupled to the differential mechanism such that power is transmitted. A differential state of the differential mechanism is controlled by controlling an operating state of the first electric motor. The second electric motor is coupled to an output rotating member of the electrical transmission mechanism such that power is transmitted. The mechanical transmission mechanism constitutes part of a power transmission path between the output rotating member and drive wheels. This is, for example, a drive system for a vehicle, described in Japanese Patent Application Publication No. 2006-327583 (JP 2006-327583 A). JP 2006-327583 A describes that a known planetary gear-type automatic transmission is used as the mechanical transmission mechanism and the automatic transmission is shifted in accordance with a predetermined shift map.

Incidentally, when there is a malfunction that prevents the first electric motor from controlling the electrical transmission mechanism, the engine may be stopped by cutting off fuel. In such a case, in the electrical transmission mechanism, an engine rotation speed cannot be controlled by using the first electric motor, so the rotation speed of the first electric motor is determined on the basis of the rotation speed of the engine that is stopped in rotation and the rotation speed of an input rotating member of the mechanical transmission mechanism (which is synonymous with the rotation speed of the output rotating member of the electrical transmission mechanism) by consulting a relative relationship among the rotation speeds of rotating elements in the differential mechanism that performs differential action. The input rotating member of the mechanical transmission mechanism is determined on the basis of a vehicle speed and a gear ratio of the mechanical transmission mechanism. At this time, a high rotation speed of the input rotating member of the mechanical transmission mechanism may lead to an overspeed of the first electric motor. In contrast, in preparation for occurrence of the above-described malfunction, it is conceivable to cause the vehicle to travel while avoiding a traveling range, which is higher than or equal to the rotation speed of the input rotating member of the mechanical transmission mechanism and which leads to an overspeed of the first electric motor when the rotation of the engine is stopped, that is, to restrict use of a high vehicle speed and low gear ratio-side in the known shift map. However, the above restriction restricts acceleration of the vehicle up to a high vehicle speed at a low gear ratio even when a driver's acceleration request is large, so there is a possibility that drivability in traveling under normal conditions not in the event of malfunction is deteriorated.

SUMMARY

The disclosure provides a control apparatus that is used for a power transmission system including an electrical transmission mechanism and a mechanical transmission mechanism in series with each other and that is able to prevent an overspeed of a first electric motor in the event of malfunction of the electrical transmission mechanism without deteriorating drivability in traveling under normal conditions of the electrical transmission mechanism.

In a first aspect of the disclosure relates to a control apparatus for a power transmission system. The power transmission system includes an electrical transmission mechanism including a differential mechanism to which an engine is coupled such that power is transmitted and a first electric motor coupled to the differential mechanism such that power is transmitted. The electrical transmission mechanism is configured such that a differential state of the differential mechanism is controlled by controlling an operating state of the first electric motor. The power transmission system includes a second electric motor coupled to an output rotating member of the electrical transmission mechanism such that power is transmitted. The power transmission system includes a mechanical transmission mechanism that constitutes part of a power transmission path between the output rotating member and a drive wheel. The control apparatus includes a malfunction determination unit that determines whether there is a malfunction in the electrical transmission mechanism, the malfunction making the operating state of the first electric motor uncontrollable; an engine operation control unit that stops operation of the engine; and a shift control unit that, when it is determined that there is the malfunction in the electrical transmission mechanism and the operation of the engine is stopped, causes the mechanical transmission mechanism to start upshifting by the time the rotation of the engine stops.

In a second aspect of the disclosure, the control apparatus may further include an overspeed determination unit that, when it is determined that there is the malfunction in the electrical transmission mechanism and the operation of the engine is stopped, calculates an estimated rotation speed of the first electric motor in a state where the rotation of the engine is stopped, and determines whether the estimated rotation speed of the first electric motor falls within a predetermined overspeed range, and, when it is determined that the estimated rotation speed of the first electric motor falls within the predetermined overspeed range, the shift control unit may cause the mechanical transmission mechanism to start upshifting.

In a third aspect of the disclosure, the shift control unit may calculate an estimated speed ratio of the mechanical transmission mechanism, at which the rotation speed of the first electric motor falls outside the predetermined overspeed range in a state where the rotation of the engine is stopped, and may upshift the mechanical transmission mechanism such that the speed ratio of the mechanical transmission mechanism is set to the estimated speed ratio.

In a fourth aspect of the disclosure, the mechanical transmission mechanism may be an automatic transmission in which a plurality of speed positions are selectively established through a shift resulting from engaging and releasing engagement devices, and the shift control unit may cause the mechanical transmission mechanism to proceed with upshifting by engaging the engagement devices for establishing the speed position after upshifting.

In a fifth aspect of the disclosure, the differential mechanism may include three rotating elements, that is, an input element to which the engine is coupled such that power is transmitted, a reaction element to which the first electric motor is coupled such that power is transmitted, and an output element coupled to an output rotating member of the electrical transmission mechanism.

According to the first aspect of the disclosure, when it is determined that there is the malfunction in the electrical transmission mechanism and the operation of the engine is stopped, the mechanical transmission mechanism is caused to start upshifting by the time the rotation of the engine stops. Therefore, when the rotation of the engine is stopped as a result of a stop of the operation of the engine, the rotation speed of the output rotating member of the electrical transmission mechanism is decreased as compared to that before it is determined that there is the malfunction in the electrical transmission mechanism. Thus, the rotation speed of the first electric motor is lower in absolute value than that in the case where the mechanical transmission mechanism is not caused to upshift on the basis of the relative relationship among the rotation speeds of the rotating elements of the differential mechanism, so an overspeed of the first electric motor is prevented. This means that, in traveling under normal conditions of the electrical transmission mechanism, it is not required for the vehicle to travel while avoiding a traveling range, which is higher than or equal to the rotation speed of the input rotating member of the mechanical transmission mechanism and which leads to an overspeed of the first electric motor when the rotation of the engine is stopped. Thus, in the power transmission system including the electrical transmission mechanism and the mechanical transmission mechanism in series with each other, it is possible to prevent an overspeed of the first electric motor in the event of a malfunction of the electrical transmission mechanism without deteriorating drivability in traveling under normal conditions of the electrical transmission mechanism.

According to the second aspect of the disclosure, the mechanical transmission mechanism is caused to start upshifting when the estimated rotation speed of the first electric motor falls within the predetermined overspeed range in a state where the rotation of the engine is stopped, so it is possible to appropriately prevent an overspeed of the first electric motor in the event of a malfunction of the electrical transmission mechanism.

According to the third aspect of the disclosure, the mechanical transmission mechanism is caused to upshift such that the speed ratio becomes the estimated speed ratio of the mechanical transmission mechanism at which the rotation speed of the first electric motor falls outside the predetermined overspeed range in a state where the rotation of the engine is stopped, so it is possible to reliably prevent an overspeed of the first electric motor in the event of a malfunction of the electrical transmission mechanism.

According to the fourth aspect of the disclosure, the mechanical transmission mechanism is the automatic transmission in which the plurality of speed positions are selectively established through a shift resulting from engaging and releasing the engagement devices, and the shift control unit causes the mechanical transmission mechanism to proceed with upshifting by engaging the engagement devices for establishing the speed position after upshifting. Therefore, it is possible to quickly decrease the rotation speed of the output rotating member of the electrical transmission mechanism, with the result that it is possible to reliably prevent an overspeed of the first electric motor in the event of a malfunction of the electrical transmission mechanism. That is, in the case of shift control for causing the mechanical transmission mechanism to proceed with upshifting by engaging the engagement devices for establishing the speed position after upshifting, the rotation speed of the input rotating member of the mechanical transmission mechanism decreases with the process of engagement for upshifting. Therefore, as compared to the case of shift control for, after the rotation speed of the input rotating member of the mechanical transmission mechanism has decreased naturally, engaging the engagement devices for establishing the speed position after upshifting, the rate of decrease in the rotation speed of the input rotating member of the mechanical transmission mechanism increases, so it is possible to reliably prevent an overspeed of the first electric motor in the event of a malfunction of the electrical transmission mechanism.

According to the fifth aspect of the disclosure, the rotation speed of the first electric motor is decreased in absolute value, as compared to the case where the mechanical transmission mechanism is not caused to upshift, on the basis of the relative relationship among the rotation speeds of the three rotating elements of the differential mechanism, so an overspeed of the first electric motor is prevented.

BRIEF DESCRIPTION OF THE DRAWINGS

Features, advantages, and technical and industrial significance of exemplary embodiments will be described below with reference to the accompanying drawings, in which like numerals denote like elements, and wherein:

FIG. 5 is a flowchart that illustrates a relevant portion of control operations of an electronic control unit, that is, control operations for, in the power transmission system including an electrical continuously variable transmission and the automatic transmission in series with each other, preventing an overspeed of a first electric motor in the event of a malfunction in the electrical continuously variable transmission without deteriorating drivability in traveling under normal conditions of the electrical continuously variable transmission.

DETAILED DESCRIPTION OF EMBODIMENTS

Hereinafter, an embodiment of the disclosure will be described in detail with reference to the accompanying drawings.

Embodiment

Figure 1:
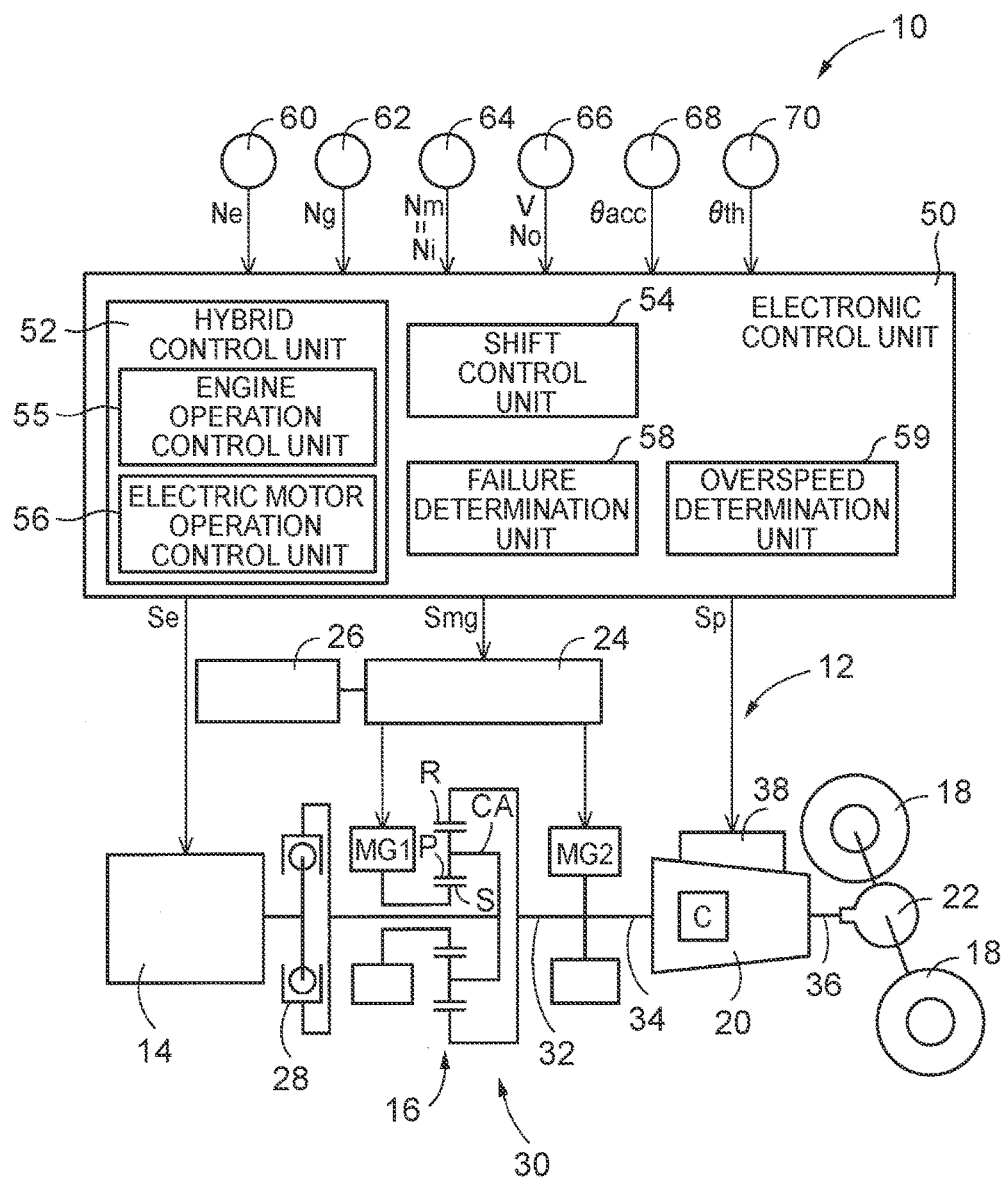
FIG. 1 is a view that illustrates the schematic configuration of a power transmission system provided in a vehicle to which the disclosure is applied, and is a view that illustrates a relevant portion of control functions and control system for various control in the vehicle.

FIG. 1 is a view that illustrates the schematic configuration of a power transmission system 12 provided in a vehicle 10 to which the disclosure is applied, and is a view that illustrates a relevant portion of a control system for various control in the vehicle 10. In FIG. 1, the vehicle 10 is a hybrid vehicle including an engine 14, a first electric motor MG1 and a second electric motor MG2. The power transmission system 12 includes a power distribution mechanism 16 and an automatic transmission (AT) 20. The power distribution mechanism 16 serves as a differential mechanism in which each of the engine 14, the first electric motor MG1 and the second electric motor MG2 is coupled to any one of a plurality of rotating elements (rotating members) such that power is transmitted. The automatic transmission (AT) 20 is arranged between the power distribution mechanism 16 and drive wheels 18. In the power transmission system 12, power (when not specifically distinguished from one another, power is synonymous with torque and force) that is output from the engine 14 or the second electric motor MG2 is transmitted to the automatic transmission 20, and is transmitted from the automatic transmission 20 to the drive wheels 18 via a differential gear unit 22, and the like.

The engine 14 is a main power source of the vehicle 10, and is a known internal combustion engine, such as a gasoline engine and a diesel engine. An operating state of the engine 14, such as a throttle valve opening degree θth, an intake air amount, a fuel supply amount and ignition timing, is controlled by an electronic control unit 50 (described later). Thus, an engine torque Te is controlled.

Each of the first electric motor MG1 and the second electric motor MG2 is a motor generator that has the function of a motor and the function of a generator and that is selectively operated as a motor or a generator. These first electric motor MG1 and second electric motor MG2 are connected to a battery 26 via an inverter 24. The inverter 24 is provided in the power transmission system 12. The battery 26 is provided in the power transmission system 12. As the inverter 24 is controlled by the electronic control unit 50 (described later), an MG1 torque Tg and an MG2 torque Tm that are output torques (or regenerative torques) of the first electric motor MG1 and second electric motor MG2 are controlled. The battery 26 is an electrical storage device that exchanges electric power with each of the first electric motor MG1 and the second electric motor MG2.

The power distribution mechanism 16 is formed of a known single pinion planetary gear train, and functions as the differential mechanism that provides differential action. The single pinion planetary gear train includes a sun gear S, a ring gear R and a carrier CA as three rotating elements. The ring gear R is arranged concentrically with the sun gear S. The carrier CA supports pinion gears P such that the pinion gears P are rotatable and revolvable. Each of the pinion gears P is in mesh with the sun gear S and the ring gear R. In the power transmission system 12, the engine 14 is coupled to the carrier CA via a damper 28 such that power is transmitted, the first electric motor MG1 is coupled to the sun gear S such that power is transmitted, and the second electric motor MG2 is coupled to the ring gear R such that power is transmitted. In the power distribution mechanism 16, the carrier CA functions as an input element, the sun gear S functions as a reaction element, and the ring gear R functions as an output element.

Figure 2:
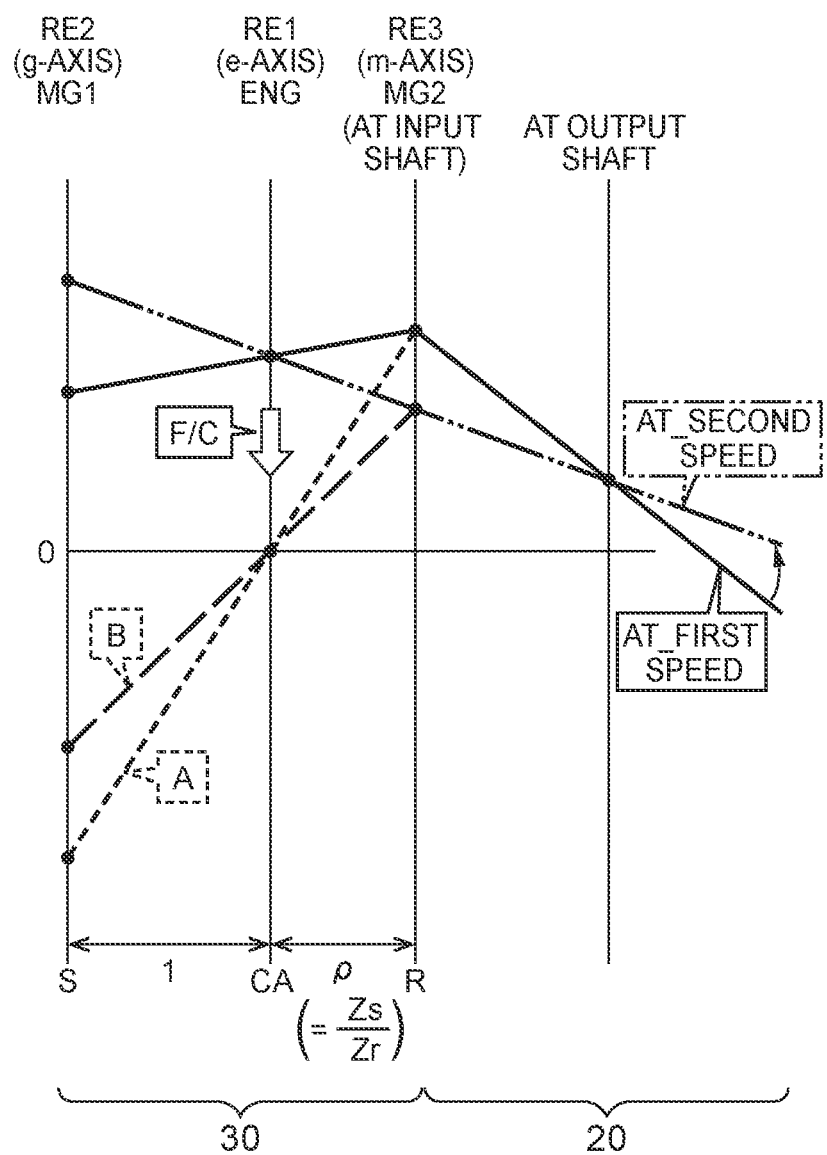
FIG. 2 is a collinear diagram that shows a relative relationship among rotation speeds of rotating elements in a power distribution mechanism, and is a view that shows an example in traveling.

A relative relationship among the rotation speeds of the rotating elements in the power distribution mechanism 16 is shown by the collinear diagram in FIG. 2. In this collinear diagram, the vertical axis S (g-axis), the vertical axis CA (e-axis) and the vertical axis R (m-axis) respectively represent the rotation speed of the sun gear S, the rotation speed of the carrier CA and the rotation speed of the ring gear R, and the interval between any adjacent two of the vertical axis S, the vertical axis CA and the vertical axis R is set such that, where the interval between the vertical axis S and the vertical axis CA is 1, the interval between the vertical axis CA and the vertical axis R is $\rho$ (that is, Gear ratio $\rho$ of the power distribution mechanism 16=Number of teeth Zs of the sun gear S/Number of teeth Zr of the ring gear R). As for the continuous line and the alternate long and two-short dashed line, a state where the speed position (gear position) of the automatic transmission 20 is low gear (for example, first-speed gear position) (see the continuous line) and a state where the speed position (gear position) is high gear (for example, second-speed gear position) (see the alternate long and two-short dashed line) are compared with each other at the same vehicle speed V and the same engine rotation speed Ne.

Each of the continuous line and the alternate long and two-short dashed line in FIG. 2 indicates the relative rotation speeds of the rotating elements in hybrid drive mode in which the vehicle is allowed to perform engine traveling. In engine traveling, the vehicle travels by using at least the engine 14 as a drive source. In this hybrid drive mode, in the power distribution mechanism 16, when a reaction torque that is a negative torque generated by the first electric motor MG1 is input to the sun gear S in positive rotation with respect to the engine torque Te that is input to the carrier CA, a direct engine torque Td ($=Te/(1+\rho)=-(1/\rho) \times Tg$) that is a positive torque in positive rotation appears in the ring gear R. In response to a required driving force, the combined torque of the direct engine torque Td and the MG2 torque Tm is transmitted to the drive wheels 18 via the automatic transmission 20 as a driving force in a vehicle forward traveling direction. At this time, the first electric motor MG1 functions as a generator that generates a negative torque in positive rotation. An electric power Wg generated by the first electric motor MG1 is used to charge the battery 26 or is consumed by the second electric motor MG2. The second electric motor MG2 outputs the MG2 torque Tm by using all or part of the generated electric power Wg or using electric power from the battery 26 in addition to the generated electric power Wg. When an electric power Wm consumed by the second electric motor MG2 is an electric power resulting from consuming all the generated electric power Wg and does not include an electric power resulting from consuming an electric power taken out from the battery 26, the charge and discharge power balance of the battery 26 is even.

As indicated by the dashed lines A, B in FIG. 2, in the collinear diagram of motor drive mode in which the vehicle is allowed to perform motor traveling, the rotation of the carrier CA is set to zero and the MG2 torque Tm that is a positive torque in positive rotation is input to the ring gear R in the power distribution mechanism 16. In motor traveling, the vehicle travels by using the second electric motor MG2 as a drive source while the engine 14 is stopped. At this time, the first electric motor MG1 coupled to the sun gear S is placed in a no-load state and is caused to rotate at idle in negative rotation. That is, in the motor drive mode, the engine 14 is not driven, the engine rotation speed Ne is set to zero, and the MG2 torque Tm (here, power running torque in positive rotation) is transmitted to the drive wheels 18 via the automatic transmission 20 as a driving force in the vehicle forward traveling direction.

An electrical continuously variable transmission 30 (see FIG. 1) is provided in the power transmission system 12. The electrical continuously variable transmission 30 includes the power distribution mechanism 16 including three rotating elements, that is, the carrier CA, the sun gear S and the ring gear R. The carrier CA serves as a first rotating element RE1 to which the engine 14 is coupled such that power is transmitted. The sun gear S serves as a second rotating element RE2 to which the first electric motor MG1 that serves as a differential electric motor is coupled such that power is transmitted. The ring gear R serves as a third rotating element RE3 to which the second electric motor MG2 that serves as a driving electric motor is coupled such that power is transmitted. The electrical continuously variable transmission 30 serves as an electrical transmission mechanism (electrical differential mechanism). In the electrical transmission mechanism (electrical differential mechanism), the differential state of the power distribution mechanism 16 is controlled by controlling the operating state of the first electric motor MG1. That is, the electrical continuously variable transmission 30 includes the power distribution mechanism 16 and the first electric motor MG1. The engine 14 is coupled to the power distribution mechanism 16 such that power is transmitted. The first electric motor MG1 is coupled to the power distribution mechanism 16 such that power is transmitted. The differential state of the power distribution mechanism 16 is controlled by controlling the operating state of the first electric motor MG1. The electrical continuously variable transmission 30 is operated as an electrical continuously variable transmission that changes a speed ratio γ0 Engine rotation speed Ne/MG2 rotation speed Nm).

Referring back to FIG. 1, the automatic transmission 20 is a mechanical transmission mechanism that constitutes part of a power transmission path between a transmission member 32 and the drive wheels 18. The transmission member 32 is an output rotating member of the electrical continuously variable transmission 30. The transmission member 32 is integrally coupled to the ring gear R, and is integrally coupled to a transmission input shaft (AT input shaft) 34 that is an input rotating member of the automatic transmission 20. The second electric motor MG2 is coupled to the transmission member 32 such that power is transmitted. The power transmission system 12 includes the electrical continuously variable transmission 30 and the automatic transmission 20 in series with each other. The automatic transmission 20, for example, includes a plurality of sets of planetary gear trains and a plurality of engagement devices, and is a known planetary gear automatic transmission that carries out a so-called clutch-to-clutch shift. In the clutch-to-clutch shift, the automatic transmission 20 is caused to shift by changing the engaged and released states of any two of the plurality of engagement devices. That is, the automatic transmission 20 is the mechanical transmission mechanism that shifts by engaging and releasing the engagement devices and that selectively establishes a plurality of speed positions (gear positions) having different speed ratios (gear ratios) γat (=AT input rotation speed Ni/AT output rotation speed No).

Each of the plurality of engagement devices is a hydraulic friction engagement device that transmits rotation and torque between the transmission input shaft 34 and a transmission output shaft (AT output shaft) 36. The transmission input shaft 34 receives power from the engine 14 or the second electric motor MG2. The transmission output shaft 36 is the output rotating member of the automatic transmission 20, and transmits power to the drive wheels 18. The engaged or released state of each of these engagement devices is controlled such that the corresponding torque capacity (clutch torque) is changed by adjusting an engaging hydraulic pressure (clutch hydraulic pressure) with the use of solenoid valves, and the like, in a hydraulic control circuit 38 provided in the automatic transmission 20. In the present embodiment, for the sake of convenience, the plurality of engagement devices are referred to as clutches C; however, the clutches C include known brakes, or the like, other than clutches.

The clutch torque of each clutch C, for example, depends on the friction coefficient of the friction material of the clutch C and the clutch hydraulic pressure for pressing the friction plates. In order to transmit torque (for example, AT input torque Ti that is a torque that is input to the transmission input shaft 34) between the transmission input shaft 34 and the transmission output shaft 36 without slipping each clutch C (that is, without occurrence of a differential rotation speed in each clutch C), a clutch torque that gives a clutch transmission torque (that is, a torque assigned to each clutch C) that needs to be assigned to each clutch C for that torque is required. However, in the clutch torque that provides a clutch transmission torque, even when the clutch torque is increased, the clutch transmission torque does not increase. That is, the clutch torque corresponds to the maximum torque that each clutch C is able to transmit, and the clutch transmission torque corresponds to a torque that each clutch C actually transmits. The clutch torque (or the clutch transmission torque) and the clutch hydraulic pressure, for example, have substantially a proportional relation except a region in which a clutch hydraulic pressure required to pack each clutch C is supplied.

Figures 3, 4:
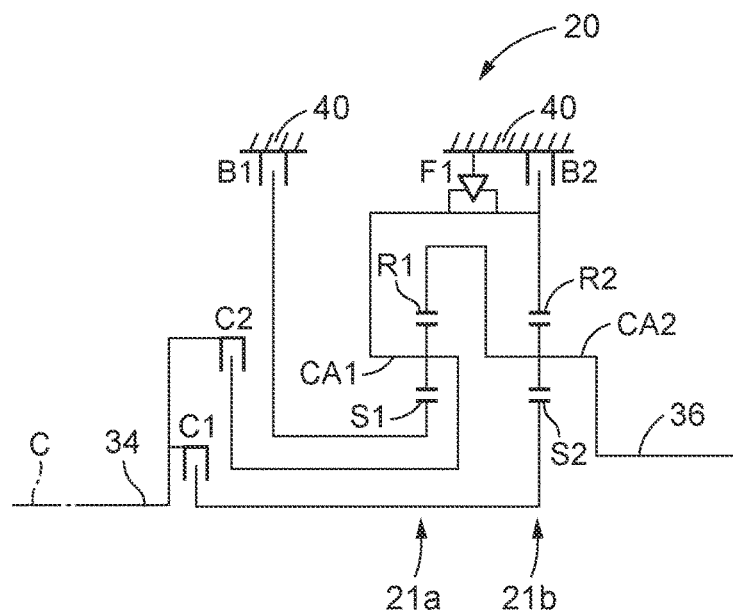
FIG. 3 is a skeletal view that illustrates an example of an automatic transmission.
FIG. 4 is an operation chart that illustrates a relationship between a shift operation of the automatic transmission illustrated in FIG. 3 and a combination of operated engagement devices that are used for the shift operation.

FIG. 3 is a skeletal view that illustrates an example of the automatic transmission 20. The automatic transmission 20 is substantially symmetric with respect to the axis C of the transmission input shaft 34, and the lower half below the axis C is omitted in FIG. 3. In FIG. 3, in the automatic transmission 20, rotating elements (sun gears S1, S2, carriers CA1, CA2 and ring gears R1, R2) of a first planetary gear train 21*a* and second planetary gear train 21*b* are partially coupled to each other or coupled to the transmission input shaft 34, a case 40 that serves as a non-rotating member or the transmission output shaft 36 directly or indirectly (or selectively) via the clutch C (such as clutches C1, C2 and brakes B1, B2) or a one-way clutch F1. As a result of control for engaging or releasing each of the clutches C, the forward four-speed gear positions are established as shown in the engagement operation chart in FIG. 4 in response to the driver's accelerator operation, the vehicle speed V, and the like. "1st" to "4th" in FIG. 4 respectively mean the first-speed gear position to the fourth-speed gear position as the forward gear positions. The engagement operation chart of FIG. 4 summarizes the relationship between each gear position and the operation state of each clutch C. The circle mark denotes an engaged state, the triangle mark denotes an engaged state during engine brake, and the blank denotes a released state. Because the one-way clutch F1 is provided in parallel with the brake B2 that establishes the first-speed gear position "1st", the brake B2 does not need to be engaged at the time of the start of movement (at the time of acceleration).

Referring back to FIG. 1, the vehicle 10, for example, includes the electronic control unit 50 that includes a control apparatus for the power transmission system 12. FIG. 1 is a view that shows the input/output lines of the electronic control unit 50, and is a functional block diagram that illustrates a relevant portion of control functions implemented by the electronic control unit 50. The electronic control unit 50 includes a so-called microcomputer. The microcomputer includes, for example, a CPU, a RAM, a ROM, input/output interfaces, and the like. The CPU executes various control over the vehicle 10 by executing signal processing in accordance with programs prestored in the ROM while utilizing a temporary storage function of the RAM. For example, the electronic control unit 50 is configured to execute various output control, including output control over the engine 14 and regenerative control over the first electric motor MG1 and the second electric motor MG2, shift control over the automatic transmission 20, and the like. The electronic control unit 50 is, where necessary, split into an electronic control unit for controlling an engine, an electronic control unit for controlling an electric motor, an electronic control unit for controlling hydraulic pressure (for controlling a shift), and the like.

Various actual values based on detection signals detected by various sensors of the vehicle 10 are supplied to the electronic control unit 50. The various sensors include, for example, an engine rotation speed sensor 60, electric motor rotation speed sensors 62, 64, such as resolvers, a vehicle speed sensor 66, an accelerator operation amount sensor 68, a throttle valve opening degree sensor 70, and the like. The various actual values include, for example, the engine rotation speed Ne, the MG1 rotation speed Ng, the MG2 rotation speed Nm, the AT output rotation speed No, an accelerator operation amount θacc, the throttle valve opening degree θth, and the like. The engine rotation speed Ne is the rotation speed of the engine 14. The MG1 rotation speed Ng is the rotation speed of the first electric motor MG1. The MG2 rotation speed Nm is the rotation speed of the second electric motor MG2, and corresponds to the AT input rotation speed Ni that is the rotation speed of the transmission input shaft 34. The AT output rotation speed No that is the rotation speed of the transmission output shaft 36, and corresponds to the vehicle speed V. The accelerator operation amount θacc is the operation amount of an accelerator pedal as a driver's acceleration request amount. The throttle valve opening degree θth is the opening degree of an electronic throttle valve. An engine output control command signal Se, an electric motor control command signal Smg, a hydraulic pressure control command signal Sp, and the like, are output from the electronic control unit 50. The engine output control command signal Se is used to control the output of the engine 14. The electric motor control command signal Smg is used to operate the inverter 24 that controls the first electric motor MG1 and the second electric motor MG2. The hydraulic pressure control command signal Sp is used to control the clutches C associated with a shift of the automatic transmission 20. The hydraulic pressure control command signal Sp is, for example, a command signal (hydraulic pressure command value) for driving the solenoid valves that regulate clutch hydraulic pressures respectively supplied to hydraulic actuators of the clutches C, and is output to the hydraulic control circuit 38.

The electronic control unit 50 includes hybrid control means, that is, a hybrid control unit 52 and shift control means, that is, a shift control unit 54.

The hybrid control unit 52 includes the function of engine operation control means, that is, an engine operation control unit 55, and the function of electric motor operation control means, that is, an electric motor operation control unit 56. The engine operation control unit 55 controls the operation of the engine 14. The electric motor operation control unit 56 controls the operations of the first electric motor MG1 and second electric motor MG2 via the inverter 24. The hybrid control unit 52 executes hybrid drive control, or the like, by using the engine 14, the first electric motor MG1 and the second electric motor MG2 with the use of those control functions. Specifically, the hybrid control unit 52 calculates a required driving force Fdem by applying the accelerator operation amount θacc and the vehicle speed V to a relationship (for example, a driving force map) empirically obtained or obtained by design and stored in advance (that is, predetermined). The hybrid control unit 52 outputs command signals (the engine output control command signal Se and the electric motor control command signal Smg) for controlling the engine 14, the first electric motor MG1 and the second electric motor MG2 such that the required driving force Fdem is obtained in consideration of an engine optimal fuel consumption point, a transmission loss, an auxiliary load, the gear ratio γat of the automatic transmission 20, chargeable and dischargeable powers Win, Wout of the battery 26, and the like. As a result of this control, the speed ratio γ0 of the electrical continuously variable transmission 30 is controlled.

The shift control unit 54 executes shift control over the automatic transmission 20 such that the required driving force Fdem is obtained in cooperation with control over the engine 14, the first electric motor MG1, the second electric motor MG2 and the speed ratio γ0 of the electrical continuously variable transmission 30 by the hybrid control unit 52, and the like. Specifically, when the shift control unit 54 determines to cause the automatic transmission 20 to shift in order to obtain the required driving force Fdem, the shift control unit 54 outputs, to the hydraulic control circuit 38, the hydraulic pressure control command signal Sp for engaging and/or releasing the clutches C associated with the shift of the automatic transmission 20 such that the gear position determined to satisfy the required driving force Fdem is established.

Incidentally, there may be a malfunction in the electrical continuously variable transmission 30, and the malfunction may make the operating state of the first electric motor MG1 uncontrollable. The malfunction in the electrical continuously variable transmission 30 is, for example, a malfunction on the first electric motor MG1 or a malfunction on the engine 14. When there is a malfunction on the first electric motor MG1, it is not possible to control the operating state of the first electric motor MG1, so control over the electrical continuously variable transmission 30 by the first electric motor MG1 is disabled. In this malfunction on the first electric motor MG1, the first electric motor MG1 cannot provide reaction for the engine torque Te, so it is desirable to stop the operation of the engine 14. In a malfunction on the engine 14, it is desirable to stop the operation of the engine 14 to stop the rotation of the engine 14 (that is, to set the engine rotation speed Ne to zero). For this reason, in this malfunction on the engine 14, even when the first electric motor MG1 has no malfunction and the first electric motor MG1 is able to be operated, it is not allowed to freely operate the first electric motor MG1 because the rotation of the engine 14 is stopped (that is, because the engine rotation speed Ne is restricted to zero). A malfunction in the electrical continuously variable transmission 30 is a malfunction that requires a stop of the rotation of the engine 14.

When the rotation of the engine 14 is stopped because a malfunction has occurred in the electrical continuously variable transmission 30 during engine traveling, the MG1 rotation speed Ng is determined (see FIG. 2) on the basis of the AT input rotation speed Ni (which is synonymous with the MG2 rotation speed Nm) and the engine rotation speed Ne that decreases toward zero by consulting the relative relationship among the rotation speeds of the three rotating elements of the power distribution mechanism 16. At this time, as the AT input rotation speed Ni increases, an overspeed of the first electric motor MG1 is easier to occur. As the vehicle speed V increases or as the gear position of the automatic transmission 20 becomes a lower vehicle speed-side (lower-side) gear position, the AT input rotation speed Ni is easier to increase. For this reason, in order prevent an overspeed of the first electric motor MG1 in the event of a malfunction in the electrical continuously variable transmission 30, it is conceivable to make preparations for occurrence of a malfunction in the electrical continuously variable transmission 30 by restricting use of a high vehicle speed-side and low gear ratio-side region during engine traveling under normal conditions not in the event of a malfunction. However, such restriction restricts acceleration of the vehicle up to a high vehicle speed at a low gear ratio even when a driver's acceleration request is large, so there is a possibility that drivability in engine traveling under normal conditions is deteriorated.

From another viewpoint, if there occurs a malfunction in the electrical continuously variable transmission 30 during engine traveling, it is allowed to perform retreat traveling through motor traveling using the second electric motor MG2. In motor traveling in which the AT input torque Ti is lower than that in engine traveling, it is conceivable to downshift the automatic transmission 20 in order to ensure driving force. However, the AT input rotation speed Ni is further increased as a result of downshift of the automatic transmission 20, so an overspeed of the first electric motor MG1 is further easier to occur.

When there occurs a malfunction in the electrical continuously variable transmission 30 during engine traveling and the rotation of the engine 14 is stopped, the electronic control unit 50 causes the automatic transmission 20 to upshift. Because the AT input rotation speed Ni is decreased as a result of the upshift of the automatic transmission 20, an overspeed of the first electric motor MG1 is more difficult to occur. Ensuring the durability of the first electric motor MG1 is given a higher priority than ensuring driving force in motor traveling. If the automatic transmission 20 is caused to start upshifting after the rotation of the engine 14 is stopped, it is not possible to prevent an overspeed of the first electric motor MG1. For this reason, the electronic control unit 50 causes the automatic transmission 20 to start upshifting by the time the rotation of the engine 14 stops. Preferably, the electronic control unit 50 completes the upshift of the automatic transmission 20 by the time the rotation of the engine 14 stops.

When an overspeed of the first electric motor MG1 does not occur in a state where the rotation of the engine 14 is stopped, it is not required to cause the automatic transmission 20 to upshift. For this reason, at the time when there occurs a malfunction in the electrical continuously variable transmission 30, the electronic control unit 50 predicts whether an overspeed of the first electric motor MG1 occurs if the rotation of the engine 14 is stopped, and, when it is determined that an overspeed of the first electric motor MG1 occurs, causes the automatic transmission 20 to start upshifting.

When the AT input rotation speed Ni is decreased by causing the automatic transmission 20 to upshift into at least one gear higher vehicle speed-side (higher-side) gear position, an overspeed of the first electric motor MG1 is prevented. Preferably, it is desirable to decrease the AT input rotation speed Ni such that an overspeed of the first electric motor MG1 reliably does not occur. For this reason, the electronic control unit 50 causes the automatic transmission 20 to upshift into a high-side gear position having a gear ratio γat smaller than or equal to the gear ratio γat of the automatic transmission 20, at which an overspeed of the first electric motor MG1 does not occur in a state where the rotation of the engine 14 is stopped.

Generally, in the automatic transmission 20 in which the gear position is established through control for engaging or releasing the clutches C, at the time of an upshift in a driven state, a power-off upshift is carried out. In the power-off upshift, a decrease in the AT input rotation speed Ni is waited, and, after the AT input rotation speed Ni has decreased to near a synchronization rotation speed after shifting, the clutches C for establishing the gear position after upshifting are engaged. On the other hand, in the automatic transmission 20, at the time of an upshift in a driving state, a power-on upshift is carried out. In the power-on upshift, the AT input rotation speed Ni is forcibly decreased by engaging the clutches C for establishing the gear position after upshifting to proceed with upshifting. In the event of a malfunction in the electrical continuously variable transmission 30, no torque is output from the electrical continuously variable transmission 30, so the power-off upshift may be carried out. However, the power-off upshift is lower in the rate of decrease in the AT input rotation speed Ni than the power-on upshift. In addition, in the power transmission system 12, the second electric motor MG2 is coupled to the transmission input shaft 34, so the rate of decrease in the AT input rotation speed Ni becomes lower due to the inertia of the second electric motor MG2. As a result, the power-off upshift more easily causes an overspeed of the first electric motor MG1 to occur depending on the rate of decrease in the engine rotation speed Ne as compared to the power-on upshift. For this reason, preferably, it is desirable to increase the rate of decrease in the AT input rotation speed Ni by carrying out the power-on upshift to make an overspeed of the first electric motor MG1 difficult to occur. When there occurs a malfunction in the electrical continuously variable transmission 30 during engine traveling and the rotation of the engine 14 is stopped, the electronic control unit 50 causes the automatic transmission 20 to carry out the power-on upshift.

Specifically, the electronic control unit 50 further includes malfunction determination means, that is, a malfunction determination unit 58, and overspeed determination means, that is, an overspeed determination unit 59.

The malfunction determination unit 58 determines whether there is a malfunction in the electrical continuously variable transmission 30, which makes the operating state of the first electric motor MG1 uncontrollable. The malfunction determination unit 58 determines that there is a malfunction in the electrical continuously variable transmission 30, for example, when there is a malfunction in the first electric motor MG1, which causes a current sensor value for the first electric motor MG1 in the inverter 24 to be abnormal for the electric motor control command signal Smg, when there is a malfunction in the inverter 24, such as overcurrent, internal circuit malfunction and short circuit, when there is an abnormality, such as an abnormality of communication of the control apparatus for controlling an electric motor in the electronic control unit 50 with the first electric motor MG1 or the second electric motor MG2, when there is an abnormality in the battery 26, such as an abnormality in control over the chargeable and dischargeable powers Win, Wout of the battery 26, or when there is a malfunction in the engine 14, which causes an engine output abnormality or an engine start abnormality for the engine output control command signal Se.

The engine operation control unit 55 stops the operation of the engine 14. Preferably, during engine traveling, when the malfunction determination unit 58 determines that there is a malfunction in the electrical continuously variable transmission 30, the engine operation control unit 55 executes engine stop process for stopping the operation of the engine 14. The engine operation control unit 55, for example, executes engine stop process by cutting off fuel (F/C) to the engine 14.

During engine traveling, when the malfunction determination unit 58 determines that there is a malfunction in the electrical continuously variable transmission 30 and the engine operation control unit 55 executes the engine stop process, the overspeed determination unit 59 calculates an estimated rotation speed of the first electric motor MG1 (hereinafter, referred to as estimated MG1 rotation speed Nge) in a state where the rotation of the engine 14 is stopped. The electrical continuously variable transmission 30 is configured such that, when the rotation speeds of any two of the three rotating elements of the power distribution mechanism 16 are determined, the rotation speed of the remaining one rotating element is also determined. For this reason, the overspeed determination unit 59 calculates the estimated MG1 rotation speed Nge by applying the AT input rotation speed Ni to the following mathematical expression (1) that is a mathematical expression for estimating the MG1 rotation speed Ng at the time when the engine rotation speed Ne is set to zero and that is set in advance on the basis of the relative relationship among the rotation speeds of the three rotating elements of the power distribution mechanism 16 (see the states of the dashed lines A, B in the collinear diagram of FIG. 2). The overspeed determination unit 59 determines whether the estimated MG1 rotation speed Nge falls within a predetermined overspeed range. The overspeed determination unit 59 determines whether the estimated MG1 rotation speed Nge falls within the predetermined overspeed range on the basis of whether the absolute value of the estimated MG1 rotation speed Nge is higher than or equal to a predetermined overspeed Ngo (>0). The predetermined overspeed range is a rotation speed range set in advance such that the absolute value of the MG1 rotation speed Ng becomes higher than or equal to the predetermined overspeed Ngo. The predetermined overspeed Ngo is, for example, a lower limit value of the MG1 rotation speed Ng (absolute value) set in advance for determining an overspeed of the first electric motor MG1 in consideration of the durability of the first electric motor MG1.

$$Nge=-(1/\rho) \times Ni \quad (1)$$

During engine traveling, when the malfunction determination unit 58 determines that there is a malfunction in the electrical continuously variable transmission 30 and the engine operation control unit 55 executes the engine stop process, the shift control unit 54 outputs, to the hydraulic control circuit 38, the hydraulic pressure control command signal Sp for causing the automatic transmission 20 to start upshifting by the time the rotation of the engine 14 stops. Preferably, when the overspeed determination unit 59 determines that the estimated MG1 rotation speed Nge falls within the predetermined overspeed range, the shift control unit 54 causes the automatic transmission 20 to start upshifting. The shift control unit 54 carries out this upshift through power-on upshift. For example, the shift control unit 54 carries out power-on upshift in order to complete the upshift of the automatic transmission 20 by the time the rotation of the engine 14 stops.

The shift control unit 54 calculates an estimated gear ratio γate of the automatic transmission 20 at which the MG1 rotation speed Ng falls outside the predetermined overspeed range in a state where the rotation of the engine 14 is stopped. The overspeed determination unit 59 calculates a gear ratio γata after upshifting by applying the AT output rotation speed No to the following mathematical expression (2) that is a theoretical mathematical expression of the gear ratio γ where the engine rotation speed Ne is zero and the MG1 rotation speed Ng is the predetermined overspeed Ngo, which is set in advance on the basis of the relative relationship among the rotation speeds of the three rotating elements of the power distribution mechanism 16 (see the states of the dashed lines A, B in the collinear diagram of FIG. 2). A high-side gear ratio that is a gear ratio γat larger than the gear ratio γata after upshifting is the estimated gear ratio γate of the automatic transmission 20, at which the MG1 rotation speed Ng falls outside the predetermined overspeed range. The shift control unit 54 causes the automatic transmission 20 to upshift such that the gear ratio γat of the automatic transmission 20 is set to the estimated gear ratio γate. The shift control unit 54 causes the automatic transmission 20 to upshift into the gear position in which the gear ratio γat of the automatic transmission 20 becomes the estimated gear ratio γate. When there are a plurality of gear positions of the automatic transmission 20, in which the gear ratio γat becomes the estimated gear ratio γate, the shift control unit 54, for example, causes the automatic transmission 20 to upshift into the lowest gear position among the gear positions in which the gear ratio γat becomes the estimated gear ratio γate.

$$\gamma ata = \rho \times Ngo/No \quad (2)$$

FIG. 5 is a flowchart that shows a relevant portion of control operations of the electronic control unit 50, that is, control operations for preventing an overspeed of the first electric motor MG1 in the event of a malfunction in the electrical continuously variable transmission 30 without deteriorating drivability under normal conditions of the electrical continuously variable transmission 30 in the power transmission system 12 including the electrical continuously variable transmission 30 and the automatic transmission 20 in series with each other. This flowchart is, for example, repeatedly executed during engine traveling.

In FIG. 5, initially, in step (hereinafter, step is omitted) S10 corresponding to the function of the malfunction determination unit 58, it is determined whether there is a malfunction in the electrical continuously variable transmission 30, the malfunction making the operating state of the first electric motor MG1 uncontrollable. When negative determination is made in S10, the routine is ended. When affirmative determination is made in S10, in S20 corresponding to the function of the engine operation control unit 55, the engine stop process is executed by cutting off fuel (F/C) to the engine 14 (see "F/C" in FIG. 2). Subsequently, in S30 corresponding to the function of the overspeed determination unit 59, it is determined whether the estimated MG1 rotation speed Nge in a state where the rotation of the engine 14 is stopped, which is calculated by using the mathematical expression (1), falls within the predetermined overspeed range (see the short dashed line segment A in FIG. 2). Determination of S30 is not carried out after the engine rotation speed Ne becomes zero but the determination is immediately carried out subsequently to S20. When negative determination is made in S30, the routine is ended. When affirmative determination is made in S30, in S40 corresponding to the function of the shift control unit 54, a command to cause the automatic transmission 20 to upshift is output. That is, a command is output to cause the automatic transmission 20 to forcibly upshift, different from normal upshift that is carried out under normal conditions of the electrical continuously variable transmission 30. For example, a command is output to cause the automatic transmission 20 to upshift into the gear position of the automatic transmission 20 in which the gear ratio γat becomes the estimated gear ratio γate of the automatic transmission 20, at which the MG1 rotation speed Ng falls outside the predetermined overspeed range in a state where the rotation of the engine 14 is stopped (see the long dashed line segment B in FIG. 2). Subsequently, in S50 corresponding to the function of the shift control unit 54, the automatic transmission 20 is cause to upshift through power-on upshift.

As described above, according to the present embodiment, when it is determined that there is a malfunction in the electrical continuously variable transmission 30 and the operation of the engine 14 is stopped, the automatic transmission 20 is cause to start upshifting by the time the rotation of the engine 14 stops. Therefore, when the rotation of the engine 14 is stopped as a result of a stop of the operation, the AT input rotation speed Ni is decreased as compared to that before it is determined that there is a malfunction in the electrical continuously variable transmission 30. Thus, the MG1 rotation speed Ng is lower in absolute value than that in the case where the automatic transmission 20 is not caused to upshift on the basis of the relative relationship among the rotation speeds of the rotating elements of the power distribution mechanism 16, so an overspeed of the first electric motor MG1 is prevented. This means that, during traveling under normal conditions of the electrical continuously variable transmission 30, it is not required for the vehicle to travel while avoiding a traveling range, which is higher than or equal to the AT input rotation speed Ni and which leads to an overspeed of the first electric motor MG1 when the rotation of the engine 14 is stopped. Thus, in the power transmission system 12 including the electrical continuously variable transmission 30 and the automatic transmission 20 in series with each other, it is possible to prevent an overspeed of the first electric motor MG1 in the event of a malfunction in the electrical continuously variable transmission 30 without deteriorating drivability in traveling under normal conditions of the electrical continuously variable transmission 30.

The present embodiment has such an advantage that, in comparison with a technique for controlling the MG1 rotation speed Ng with the use of the second electric motor MG2 by placing the automatic transmission 20 in a neutral state in the event of a malfunction in the electrical continuously variable transmission 30, it is allowed to perform retreat traveling through motor traveling using the MG2 in the event of a malfunction in the electrical continuously variable transmission 30. The present embodiment has such an advantage that, in comparison with a technique for preventing an overspeed of the first electric motor MG1 by coupling the first electric motor MG1 to the power distribution mechanism 16 via a clutch and releasing the clutch in the event of a malfunction in the electrical continuously variable transmission 30, cost and space for adding such a clutch is not required. According to the present embodiment, the durability is improved by preventing an overspeed of the first electric motor MG1 in the event of a malfunction in the electrical continuously variable transmission 30, so an opportunity to return from a temporary malfunction to normal conditions is obtained. For example, as a result of a malfunction determination in a state where a disturbance is reduced by stopping the operation of the engine 14, when it is determined as being normal, an opportunity to return to normal conditions is obtained.

According to the present embodiment, the automatic transmission 20 is caused to start upshifting when the estimated MG1 rotation speed Nge falls within the predetermined overspeed range in a state where the rotation of the engine 14 is stopped, so it is possible to appropriately prevent an overspeed of the first electric motor MG1 in the event of a malfunction in the electrical continuously variable transmission 30.

According to the present embodiment, the automatic transmission 20 is caused to upshift such that the gear ratio γat is set to the estimated gear ratio γate of the automatic transmission 20 at which the MG1 rotation speed Ng falls outside the predetermined overspeed range in a state where the rotation of the engine 14 is stopped, so it is possible to reliably prevent an overspeed of the first electric motor MG1 in the event of a malfunction in the electrical continuously variable transmission 30.

According to the present embodiment, upshift proceeds when the clutches C for establishing the gear position after upshifting are engaged, so it is possible to quickly decrease the AT input rotation speed Ni, with the result that it is possible to reliably prevent an overspeed of the first electric motor MG1 in the event of a malfunction in the electrical continuously variable transmission 30. That is, in the case of shift control through power-on upshift, as compared to the case of shift control through power-off upshift, the rate of decrease in the AT input rotation speed Ni increases, so it is possible to reliably prevent an overspeed of the first electric motor MG1 in the event of a malfunction in the electrical continuously variable transmission 30.

The embodiment of the disclosure is described in detail with reference to the accompanying drawings; however, the disclosure is also applied to other embodiments.

For example, in the above-described embodiment, the automatic transmission 20 that is a planetary gear-type automatic transmission as the mechanical transmission mechanism that constitutes part of the power transmission path between the transmission member 32 and the drive wheels 18 is illustrated; however, the disclosure is not limited to this configuration. The mechanical transmission mechanism may be, for example, a known synchromesh parallel two-shaft automatic transmission that includes a plurality of pairs of constant mesh shift gears between two shafts and of which a gear position is automatically changed by controlling engaged/released states of dog clutches (that is, intermeshing clutches) by actuators, a known dual clutch transmission (DCT) that is the synchromesh parallel two-shaft automatic transmission and that includes two-line input shafts, a known continuously variable transmission (CVT), or the like. In the case of the CVT, in the event of a malfunction in the electrical continuously variable transmission 30, the AT input rotation speed Ni is quickly decreased by, for example, increasing the rate of change in speed ratio as compared to normal conditions.

In the above-described embodiment, when the estimated MG1 rotation speed Nge in a state where the rotation of the engine 14 is stopped falls within the predetermined overspeed range, the automatic transmission 20 is caused to upshift through power-on upshift; however, the disclosure is not limited to this configuration. For example, when there is a malfunction in the electrical continuously variable transmission 30 during engine traveling and the rotation of the engine 14 is stopped, the automatic transmission 20 may be caused to upshift through power-off upshift. With this configuration as well, a certain advantageous effect that it is possible to prevent an overspeed of the first electric motor MG1 in the event of a malfunction in the electrical continuously variable transmission 30 without deteriorating drivability in traveling under normal conditions of the electrical continuously variable transmission 30 is obtained. In such a case, S30 and S50 in the flowchart of FIG. 5 are not required.

In the above-described embodiment, the power distribution mechanism 16 has the configuration of the differential mechanism including three rotating elements; however, the disclosure is not limited to this configuration. For example, when the power distribution mechanism 16 is a differential mechanism having four or more rotating elements by coupling a plurality of planetary gear trains to each other, the disclosure can be applied. The power distribution mechanism 16 may be a double pinion planetary gear train. The power distribution mechanism 16 may be a differential gear unit in which a pinion is driven by the engine 14 to rotate and a pair of bevel gears that are in mesh with the pinion are respectively operatively coupled to the first electric motor MG1 and the transmission member 32.

The above-described embodiments are only illustrative, and the disclosure may be implemented in modes including various modifications or improvements on the basis of the knowledge of persons skilled in the art.

What is claimed is:

1. A power transmission system comprising:
   an electrical transmission mechanism including a differential mechanism to which an engine is coupled such that power is transmitted and a first electric motor coupled to the differential mechanism such that power is transmitted, the electrical transmission mechanism being configured such that a differential state of the differential mechanism is controlled by controlling an operating state of the first electric motor;
   a second electric motor coupled to an output rotating member of the electrical transmission mechanism such that power is transmitted, the power transmission system including a mechanical transmission mechanism that constitutes part of a power transmission path between the output rotating member and a drive wheel; and
   a control apparatus, wherein the control apparatus has a processor programmed to
   determine whether there is a malfunction in the electrical transmission mechanism, the malfunction making the operating state of the first electric motor uncontrollable,
   stop operation of the engine when the malfunction in the electrical transmission mechanism is determined, and
   when the operation of the engine is stopped in response to the determination that there is the malfunction in the electrical transmission mechanism, cause the mechanical transmission mechanism to start upshifting by the time the rotation of the engine stops.

2. The power transmission system according to claim 1, wherein the processor is further programmed to,
   when the operation of the engine is stopped in response to the determination that there is the malfunction in the electrical transmission mechanism, calculate an estimated rotation speed of the first electric motor in a state where the rotation of the engine is stopped, and determine whether the estimated rotation speed of the first electric motor falls within a predetermined overspeed range, wherein
   when it is determined that the estimated rotation speed of the first electric motor falls within the predetermined overspeed range, the processor causes the mechanical transmission mechanism to start upshifting.

3. The power transmission system according to claim 2, wherein
   the processor calculates an estimated speed ratio of the mechanical transmission mechanism, at which the rotation speed of the first electric motor falls outside the predetermined overspeed range in a state where the rotation of the engine is stopped, and upshifts the mechanical transmission mechanism such that the speed ratio of the mechanical transmission mechanism is set to the estimated speed ratio.

4. The power transmission system according to claim 1, wherein
   the mechanical transmission mechanism is an automatic transmission in which a plurality of speed positions are selectively established through a shift resulting from engaging and releasing engagement devices, and
   the processor causes the mechanical transmission mechanism to proceed with upshifting by engaging the engagement devices for establishing the speed position after upshifting.

5. The power transmission system according to claim 1, wherein
   the differential mechanism includes three rotating elements, that is, an input element to which the engine is coupled such that power is transmitted, a reaction element to which the first electric motor is coupled such that power is transmitted, and an output element coupled to an output rotating member of the electrical transmission mechanism.

* * * * *